United States Patent
Snyder et al.

(10) Patent No.: US 12,546,469 B1
(45) Date of Patent: Feb. 10, 2026

(54) GAS TURBINE ENGINE FUEL INJECTOR WITH MULTIPLE FUEL CIRCUITS

(71) Applicant: Raytheon Technologies Corporation, Farmington, CT (US)

(72) Inventors: Timothy S. Snyder, Glastonbury, CT (US); Brandon Williams, Johnston, IA (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/951,796

(22) Filed: Sep. 23, 2022

(51) Int. Cl.
| F23D 14/58 | (2006.01) |
| F23D 11/12 | (2006.01) |
| F23R 3/28  | (2006.01) |
| F23D 11/38 | (2006.01) |

(52) U.S. Cl.
CPC .............. *F23D 14/58* (2013.01); *F23D 11/12* (2013.01); *F23R 3/28* (2013.01); *F23D 11/38* (2013.01)

(58) Field of Classification Search
CPC .......... F23D 14/58; F23D 11/12; F23D 11/38; F23R 3/28; F23R 3/343; F23R 3/36
See application file for complete search history.

(56) References Cited

U.S. PATENT DOCUMENTS

| 3,763,650 | A  | * | 10/1973 | Hussey | F23R 3/28 60/737 |
| 4,012,902 | A  |   | 3/1977  | Schirmer | |
| 4,566,268 | A  | * | 1/1986  | Hoffeins | F23D 17/002 60/39.463 |
| 5,235,814 | A  |   | 8/1993  | Leonard | |
| 6,935,117 | B2 | * | 8/2005  | Cowan | F23D 17/002 60/742 |
| 7,536,862 | B2 | * | 5/2009  | Held | F23R 3/36 60/742 |
| 7,849,693 | B2 |   | 12/2010 | Bainville | |
| 9,046,039 | B2 | * | 6/2015  | Williams | F23D 11/107 |
| 11,397,006 | B2 | * | 7/2022 | Okada | F23L 7/002 |
| 2010/0008179 | A1 | | 1/2010 | Lacy | |
| 2012/0228397 | A1 | | 9/2012 | Thomson | |
| 2013/0019584 | A1 | | 1/2013 | Koizumi | |

(Continued)

FOREIGN PATENT DOCUMENTS

DE    102007034737 A1    1/2009

OTHER PUBLICATIONS

EP Search Report for EP Patent Application No. 23199527.5 dated Feb. 15, 2024.

*Primary Examiner* — Gerald L Sung
*Assistant Examiner* — Rene D Ford
(74) *Attorney, Agent, or Firm* — Getz Balich LLC (57) ABSTRACT

An assembly is provided for a gas turbine engine. This assembly includes a fuel injector. The fuel injector includes a nozzle and a plurality of discrete fuel circuits. The discrete fuel circuits include a first fuel circuit, a second fuel circuit and a third fuel circuit. The nozzle extends axially along an axis to a nozzle tip. The first fuel circuit includes a first fuel outlet disposed at the nozzle tip. The second fuel circuit includes a plurality of second fuel outlets arranged circumferentially about the axis at the nozzle tip in a second fuel outlet array. The third fuel circuit includes a plurality of third fuel outlets arranged circumferentially about the axis at the nozzle tip in a third fuel outlet array.

12 Claims, 11 Drawing Sheets

(56) References Cited

U.S. PATENT DOCUMENTS

| | | | |
|---|---|---|---|
| 2016/0040883 A1* | 2/2016 | Asai | F23R 3/10 |
| | | | 60/737 |
| 2016/0060154 A1* | 3/2016 | Cowles | F23C 3/004 |
| | | | 65/356 |
| 2021/0222881 A1* | 7/2021 | D'Agostini | F23D 14/32 |

* cited by examiner

GAS TURBINE ENGINE FUEL INJECTOR WITH MULTIPLE FUEL CIRCUITS

BACKGROUND OF THE DISCLOSURE

1. Technical Field

This disclosure relates generally to a gas turbine engine and, more particularly, to a fuel injector for the gas turbine engine.

2. Background Information

A gas turbine engine may include multiple fuel injectors for delivering fuel to a combustor for combustion with compressed air. Various types and configurations of fuel injectors are known in the art. While these known fuel injectors have various benefits, there is still room in the art for improvement. There is a need in the art, in particular, for a fuel injector which can be tuned for multiple different modes of gas turbine engine operation.

SUMMARY OF THE DISCLOSURE

According to an aspect of the present disclosure, an assembly is provided for a gas turbine engine. This assembly includes a fuel injector. The fuel injector includes a nozzle and a plurality of discrete fuel circuits. The discrete fuel circuits include a first fuel circuit, a second fuel circuit and a third fuel circuit. The nozzle extends axially along an axis to a nozzle tip. The first fuel circuit includes a first fuel outlet disposed at the nozzle tip. The second fuel circuit includes a plurality of second fuel outlets arranged circumferentially about the axis at the nozzle tip in a second fuel outlet array. The third fuel circuit includes a plurality of third fuel outlets arranged circumferentially about the axis at the nozzle tip in a third fuel outlet array.

According to another aspect of the present disclosure, another assembly is provided for a gas turbine engine. This assembly includes a combustor with a combustion chamber. The assembly also includes a fuel system including a fuel source and a fuel injector with a first fuel circuit, a second fuel circuit and a third fuel circuit. The fuel system is configured to deliver fuel from the fuel source through the fuel injector into the combustion chamber. The first fuel circuit flows a first percentage of the fuel. The second fuel circuit flows a second percentage of the fuel. The third fuel circuit flows a third percentage of the fuel. During a first mode, the first percentage and the second percentage are greater than two times the third percentage. During a second mode, the third percentage is greater than two times the first percentage and the second percentage.

According to still another aspect of the present disclosure, another assembly is provided for a gas turbine engine. This assembly includes a fuel injector. The fuel injector includes a stem, a nozzle, a first conduit, a second conduit, a third conduit, a first orifice, a second orifice and a third orifice. The nozzle is connected to and projects axially out from the stem along an axis to a tip of the nozzle. The first conduit extends within the stem and is fluidly coupled to the first orifice. The first orifice is disposed at the tip of the nozzle. The second conduit extends within the stem and is fluidly coupled to the second orifice. The second orifice is disposed at the tip of the nozzle and radially outboard from the first orifice. The third conduit extends within the stem and is fluidly coupled to the third orifice. The third orifice is disposed at the tip of the nozzle and radially outboard from the first orifice.

The assembly may also include a fuel system including a fuel source and the fuel injector. The fuel system may be configured to deliver fuel from the fuel source through the fuel injector where the first fuel circuit provides a first percentage of the fuel, the second fuel circuit provides a second percentage of the fuel and the third fuel circuit provides a third percentage of the fuel. During a first mode, the first percentage and the second percentage may be greater than the third percentage. During a second mode, the third percentage may be greater than the first percentage and the second percentage.

During a third mode, the second percentage may be within ten percent of the third percentage.

During the first mode and/or the second mode, the second percentage may be greater than the first percentage.

The first fuel circuit may be configured to direct fuel out of the nozzle through the first fuel outlet along a first trajectory. The second fuel circuit may be configured to direct fuel out of the nozzle through a first of the second fuel outlets along a second trajectory that is angularly offset from the first trajectory. The third fuel circuit may be configured to direct fuel out of the nozzle through a first of the third fuel outlets along a third trajectory that is angularly offset from the first trajectory.

The second trajectory may be angularly offset from the first trajectory by a first angle. The third trajectory may be angularly offset from the first trajectory by a second angle that may be different than the first angle.

The second trajectory may be angularly offset from the first trajectory by a first angle. The third trajectory may be angularly offset from the first trajectory by a second angle that may be equal to the first angle.

The first trajectory may be coaxial with the axis.

The first fuel outlet may be coaxial with the axis.

A first of the third fuel outlets may be circumferentially aligned with a first of the second fuel outlets.

A first of the third fuel outlets may be circumferentially offset from each of the second fuel outlets.

The second fuel outlet array may be disposed radially outboard of the first fuel outlet by a first radial distance. The third fuel outlet array may be disposed radially outboard of the first fuel outlet by a second radial distance that is greater than the first radial distance.

The second fuel outlet array may be radially aligned with the third fuel outlet array.

The second fuel circuit may also include a passage that extends to a first of the second nozzle outlets. The passage may converge as the passage that extends towards the first of the second nozzle outlets.

The second fuel circuit may also include a passage that extends to a first of the second nozzle outlets. The passage may have a uniform lateral size.

A first of the second nozzle outlets may have a circular cross-sectional geometry.

A first of the second nozzle outlets may have an elongated cross-sectional geometry.

The fuel injector may also include a stem. The nozzle may project axially out from the stem along the axis to the nozzle tip. The first fuel circuit may also include a first fuel conduit within the stem and fluidly coupled to the first fuel outlet. The second fuel circuit may also include a second fuel conduit within the stem and fluidly coupled to the second fuel outlets. The third fuel circuit may also include a third fuel conduit within the stem and fluidly coupled to the third fuel outlets.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
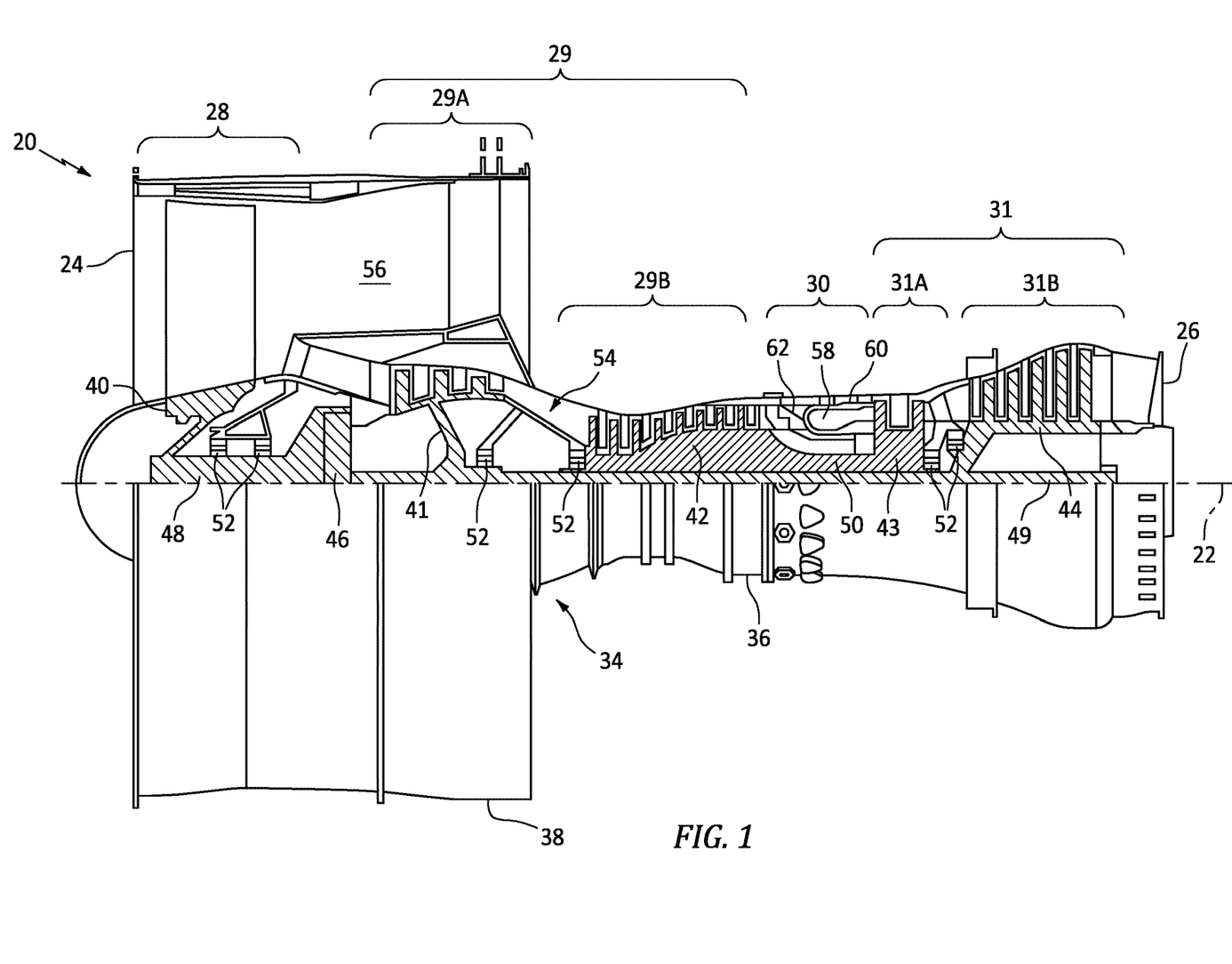
FIG. 1 is a side cutaway illustration of a gas turbine engine.

FIG. 1 is a side cutaway illustration of a gas turbine engine 20. This gas turbine engine 20 extends along an axial centerline 22 between an upstream airflow inlet 24 and a downstream airflow exhaust 26. The gas turbine engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B.

The engine sections 28, 29A, 29B, 30, 31A and 31B are arranged sequentially along the axial centerline 22 within an engine housing 34. This engine housing 34 includes an inner case 36 (e.g., a core case) and an outer case 38 (e.g., a fan case). The inner case 36 may house one or more of the engine sections 29A, 29B, 30, 31A and 31B; e.g., a core of the gas turbine engine 20. The outer case 38 may house at least the fan section 28.

The fan section 28, the LPC section 29A, the HPC section 29B, the HPT section 31A and the LPT section 31B each include a respective bladed rotor 40-44. Each of these bladed rotors 40-44 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 40 is connected to a geartrain 46, for example, through a fan shaft 48. The geartrain 46 and the LPC rotor 41 are connected to and driven by the LPT rotor 44 through a low speed shaft 49. The HPC rotor 42 is connected to and driven by the HPT rotor 43 through a high speed shaft 50. The shafts 48-50 are rotatably supported by a plurality of bearings 52; e.g., rolling element and/or thrust bearings. Each of these bearings 52 is connected to the engine housing 34 by at least one stationary structure such as, for example, an annular support strut.

During operation, air enters the gas turbine engine 20 through the airflow inlet 24. This air is directed through the fan section 28 and into a core flowpath 54 and a bypass flowpath 56. The core flowpath 54 extends sequentially through the engine sections 29A-31B; e.g., the engine core. The air within the core flowpath 54 may be referred to as "core air". The bypass flowpath 56 extends through a bypass duct, which bypasses and may be radially outboard of the engine core. The air within the bypass flowpath 56 may be referred to as "bypass air".

The core air is compressed by the LPC rotor 41 and the HPC rotor 42 and directed into a (e.g., annular) combustion chamber 58 of a (e.g., annular) combustor 60 in the combustor section 30. Fuel is injected into the combustion chamber 58 by one or more fuel injectors 62 (one schematically shown in FIG. 1) and mixed with the compressed core air to provide a fuel-air mixture. This fuel-air mixture is ignited and combustion products thereof flow through and sequentially cause the HPT rotor 43 and the LPT rotor 44 to rotate. The rotation of the HPT rotor 43 and the LPT rotor 44 respectively drive rotation of the HPC rotor 42 and the LPC rotor 41 and, thus, compression of the air received from a core airflow inlet. The rotation of the LPT rotor 44 also drives rotation of the fan rotor 40, which fan rotor 40 propels bypass air through and out of the bypass flowpath 56. The propulsion of the bypass air may account for a majority of thrust generated by the gas turbine engine 20, e.g., more than seventy-five percent (75%) of engine thrust. The gas turbine engine 20 of the present disclosure, however, is not limited to the foregoing exemplary thrust ratio.

Figure 2:
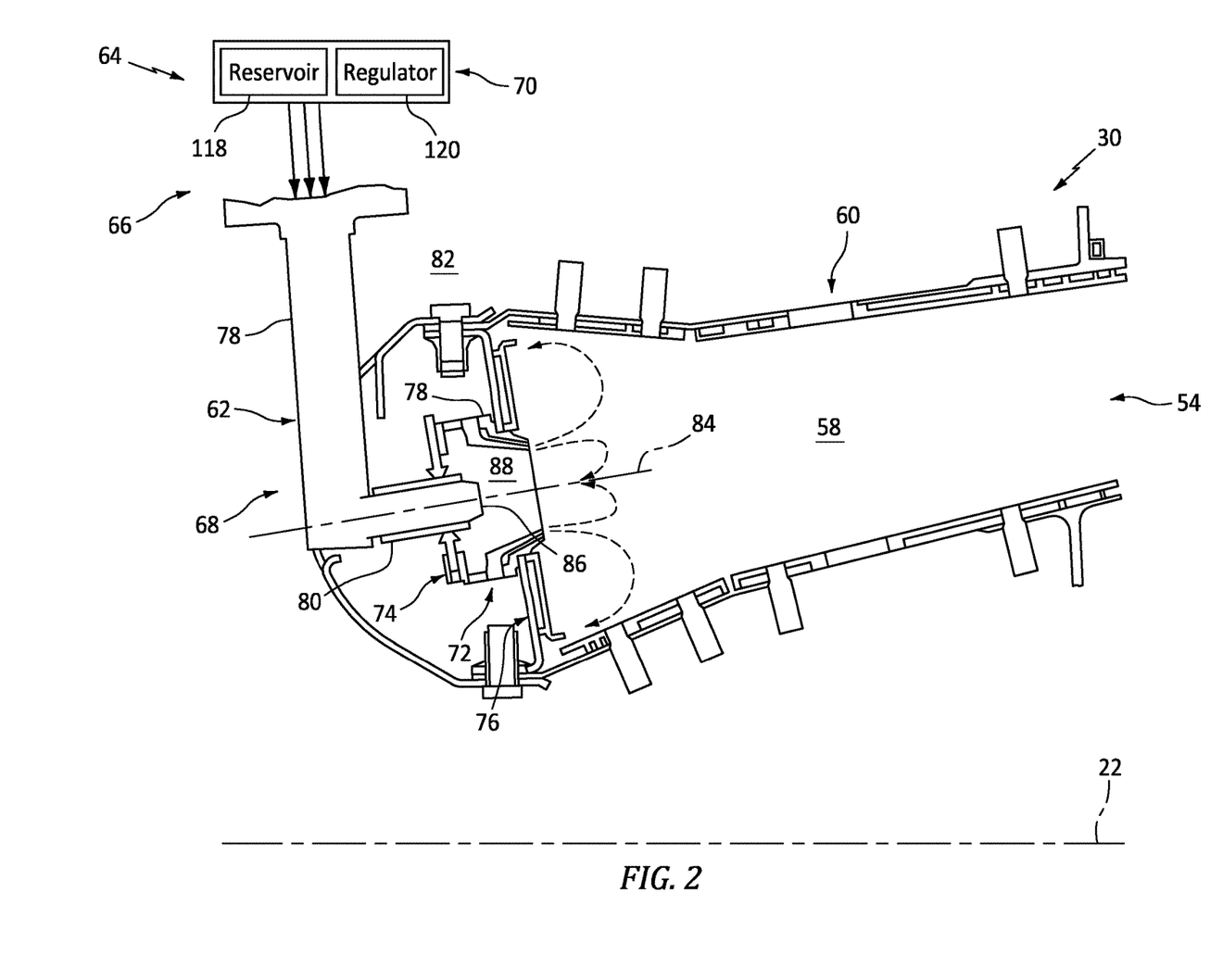
FIG. 2 is a partial side sectional illustration of a combustor section of the gas turbine engine.

FIG. 2 illustrates an assembly 64 for the gas turbine engine 20. This engine assembly 64 includes a fuel system 66 and the combustor 60. The fuel system 66 of FIG. 2 includes and one or more fuel injector assemblies 68 (one visible in FIG. 2) and a fuel source 70. The fuel system 66 is configured to selectively deliver fuel, stored within the fuel source 70, to the one or more fuel injector assemblies 68 for injection into the combustion chamber 58.

Each fuel injector assembly 68 includes a respective one of the fuel injectors 62. Each fuel injector assembly 68 may also include a swirler 72 and a mount 74 configured to couple the fuel injector 62 to the swirler 72, where the swirler 72 may be coupled to a (e.g., annular) bulkhead 76 of the combustor 60. With this arrangement, each fuel injector assembly 68 is configured to direct a mixture of fuel received from the fuel source 70 and compressed air received from the HPC section 29B (see FIG. 1) into the combustion chamber 58 for combustion.

Figure 3:
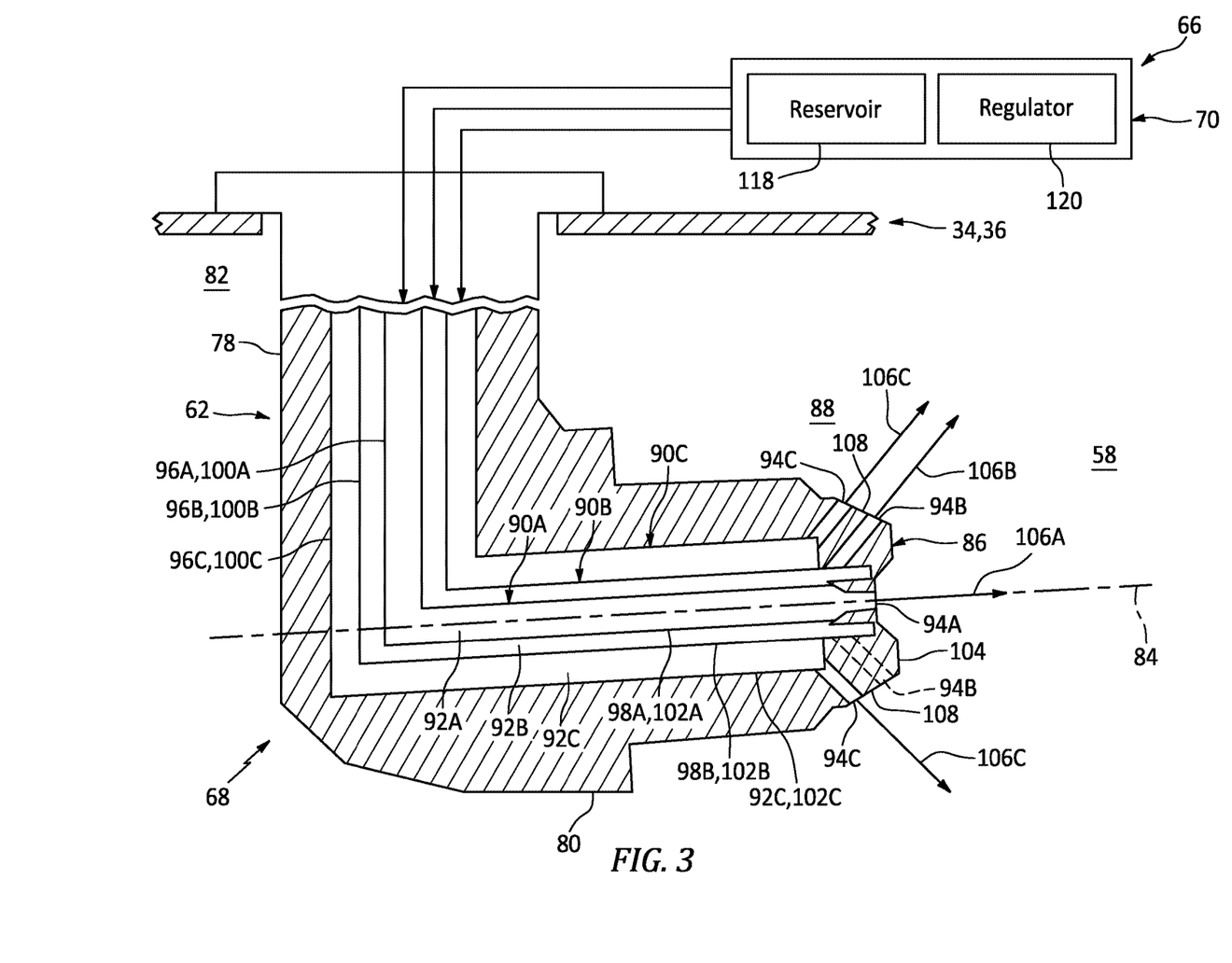
FIG. 3 is a partial side sectional illustration of a fuel injector arranged with a fuel source.

Referring to FIG. 3, each fuel injector 62 includes a fuel injector stem 78 and a fuel injector nozzle 80. A base of the injector stem 78 may be connected to the engine housing 34; e.g., a section of the inner case 36. The injector stem 78 projects (e.g., radially inward relative to the axial centerline 22; see FIG. 2) from the engine housing 34 into a (e.g., annular) plenum 82 extending about an exterior of the combustor 60 (see FIG. 2). The injector nozzle 80 is connected to (e.g., formed integral with or otherwise attached to) the injector stem 78. The injector nozzle 80 projects axially along an axis 84 of the injector nozzle 80 (e.g., generally axially along the axial centerline 22; see FIG. 2) out from the injector stem 78 to a tip 86 of the injector nozzle 80. This nozzle tip 86 may be disposed within an interior bore 88 of the swirler 72 (see FIG. 2) and faces towards the combustion chamber 58. Alternatively, the nozzle tip 86 may be disposed within a port in the bulkhead 76, within the combustion chamber 58, etc.

Each fuel injector 62 also includes a plurality of internal fuel circuits 90A-C (generally referred to as "90"). These fuel circuits 90 may be fluidly discrete from one another within the respective fuel injector 62. The first fuel circuit 90A, for example, may be completely fluidly independent (e.g., decoupled) from the second fuel circuit 90B and/or the third fuel circuit 90C within the respective fuel injector 62. The second fuel circuit 90B may be completely fluidly independent (e.g., decoupled) from the first fuel circuit 90A and/or the third fuel circuit 90C within the respective fuel injector 62. The third fuel circuit 90C may be completely fluidly independent (e.g., decoupled) from the first fuel circuit 90A and/or the second fuel circuit 90B within the respective fuel injector 62.

The first fuel circuit 90A includes a first flowpath 92A, a first circuit inlet and at least (or only) one first outlet orifice 94A. The first flowpath 92A extend within the respective fuel injector 62 from the first circuit inlet to the first outlet orifice 94A. For example, an upstream section 96A of the first flowpath 92A of FIG. 3 extends radially (relative to the nozzle axis 84) inward from the first circuit inlet, within the injector stem 78, to a downstream section 98A of the first flowpath 92A. The downstream section 98A of the first flowpath 92A of FIG. 3 extends axially (along the nozzle axis 84) from the upstream section 96A of the first flowpath 92A, within the injector nozzle 80, to the first outlet orifice 94A. The upstream section 96A of the first flowpath 92A may be at least partially (or completely) formed by an upstream first conduit 100A. The downstream section 98A of the first flowpath 92A may be at least partially (or completely) formed by a downstream first conduit 102A, where the first conduits 100A and 102A may be integral segments of a common, unitary conduit or may be separate fluidly coupled conduits. At least a portion or an entirety of the downstream section 98A of the first flowpath 92A and its downstream first conduit 102A may be aligned (e.g., coaxial) with the nozzle axis 84.

The first outlet orifice 94A is disposed at (e.g., on, adjacent or proximate) the nozzle tip 86. The first outlet orifice 94A of FIG. 3, for example, is recessed slightly axially inward (along the nozzle axis 84) from a (e.g., annular, planar) center surface 104 of the nozzle tip 86. This first outlet orifice 94A may be aligned (e.g., coaxial) with the nozzle axis 84.

The first fuel circuit 90A of FIG. 3 is configured to direct the fuel received from the fuel source 70 out of the injector nozzle 80 through the first outlet orifice 94A (e.g., into the swirler bore 88 and/or into the combustion chamber 58; see FIG. 2) along a first trajectory 106A. This first trajectory 106A may be substantially (e.g., +/− two or five degrees) or completely parallel with the nozzle axis 84. The first trajectory 106A of FIG. 3, for example, is coaxial with the nozzle axis 84. However, while the first trajectory 106A may be parallel to the nozzle axis 84, a spray angle of the first outlet orifice 94A can be configured the cover a relatively wide range; e.g., from seventy degrees (70°) to one-hundred and twenty degrees (120°) depending upon a design trajectory of the second and the third fuel circuits 90B and 90C. The first trajectory 106A may be selected to facilitate delivery of the fuel into a first (e.g., recirculation) zone within the combustion chamber 58 for combustion. The first trajectory 106A, a spray pattern of the fuel out of the first outlet orifice 94A, a flowrate of the fuel through the first outlet orifice 94A as well as various other parameters of the first fuel circuit 90A may be tailored for operation of the gas turbine engine 20 at low power settings. The first fuel circuit 90A, for example, may be sized and shaped at the first outlet orifice 94A to facilitate relatively high fuel atomization at a relatively low fuel flow rate and/or with a relatively low airflow rate through the swirler 72 (see FIG. 2).

The second fuel circuit 90B includes a second flowpath 92B, a second circuit inlet and one or more second outlet orifices 94B. The second flowpath 92B extend within the respective fuel injector 62 from the second circuit inlet to the second outlet orifices 94B. For example, an upstream section 96B of the second flowpath 92B of FIG. 3 extends radially (relative to the nozzle axis 84) inward from the second circuit inlet, within the injector stem 78, to a downstream section 98B of the second flowpath 92B. The downstream section 98B of the second flowpath 92B of FIG. 3 extends axially (along the nozzle axis 84) from the upstream section 96B of the second flowpath 92B, within the injector nozzle 80, to the second outlet orifices 94B. The upstream section 96B of the second flowpath 92B may be at least partially (or completely) formed by an (e.g., annular) upstream second conduit 100B. The downstream section 98B of the second flowpath 92B may be at least partially (or completely) formed by a (e.g., annular) downstream second conduit 102B, where the second conduits 100B and 102B may be integral segments of a common, unitary conduit or may be separate fluidly coupled conduits. The upstream section 96B of the second flowpath 92B and its upstream second conduit 100B may extend circumferentially about (e.g., completely around) the upstream section 96A of the first flowpath 92A and its upstream first conduit 100A. The downstream section 98B of the second flowpath 92B and its downstream second conduit 102B may extend circumferentially about (e.g., completely around) the downstream section 98A of the first flowpath 92A and its downstream first conduit 102A. With such a configuration, at least a portion of the second flowpath 92B within the injector stem 78 and/or within the injector nozzle 80 may be annular.

Figure 4:
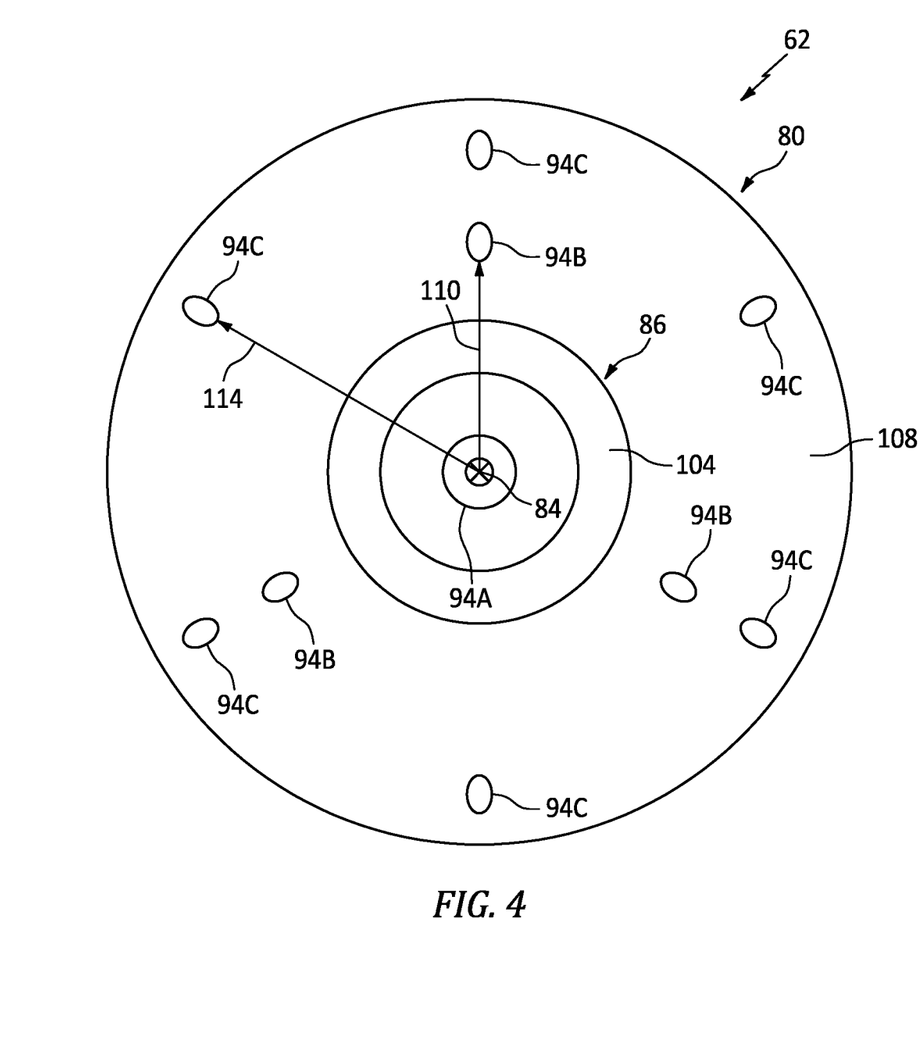
FIG. 4 is an end view illustration of a nozzle tip of the fuel injector.

The second outlet orifices 94B are disposed at (e.g., on, adjacent or proximate) the nozzle tip 86. Each of the second outlet orifices 94B of FIG. 3, for example, is recessed slightly radially inward (relative to the nozzle axis 84) from an (e.g., tubular, frustoconical) outer surface 108 of the nozzle tip 86. Referring to FIG. 4, the second outlet orifices 94B are arranged circumferentially about the nozzle axis 84 and/or the first outlet orifice 94A in an annular second outlet orifice array. This second outlet orifice array and each of its second outlet orifices 94B is disposed radially outboard of the nozzle axis 84 and/or the first outlet orifice 94A by a radial distance 110 (relative to the nozzle axis 84).

The second fuel circuit 90B of FIG. 3 is configured to direct the fuel received from the fuel source 70 out of the injector nozzle 80 through each second outlet orifice 94B (e.g., into the swirler bore 88 and/or into the combustion chamber 58; see FIG. 2) along a respective second trajectory 106B. This second trajectory 106B is angularly offset from the nozzle axis 84 and/or the first trajectory 106A by a second trajectory angle 112 (see FIGS. 6A-C); e.g., an acute angle or a right angle. This second trajectory angle 112 may be between fifteen degrees (15°) and ninety degrees (90°); e.g., between fifteen degrees (15°) and thirty degrees (30°), between thirty degrees (30°) and forty-five degrees (45°), between forty-five degrees (45°) and sixty degrees (60°), etc. The second trajectory angle 112, for example, can be optimized based upon the spray angle of the first fuel circuit 90A and its first outlet orifice 94A. For relatively low (e.g., small) first circuit spray angles, the second trajectory angle 112 can be high (e.g., greater than sixty degrees) (60°) to promote fueling of the inner and outer recirculation zones, or the second trajectory angle 112 can be low (e.g., less than forty-five degrees) (45°) to (e.g., only) fuel the center recirculation zone. For relatively high (e.g., large) first circuit spray angles, the second trajectory angle 112 can be low (e.g., less than forty-five degrees) (45°) to fuel both the center and outer recirculation zones but with a discrete (secondary) versus a continuous fuel spray cone angle (first fuel circuit), or the second trajectory angle 112 can be high (e.g., greater than sixty degrees) (60°) to (e.g., only) fuel the outer recirculation zones. These two zones may provide significant control of the fuel spray distribution to minimize both emissions and combustor tones from idle to cruise power as exemplified in FIG. 5. The second trajectory 106B may be selected to facilitate delivery of the fuel into a second (e.g., recirculation) zone within the combustion chamber 58 for combustion. The second trajectory 106B, a spray pattern of the fuel out of each second outlet orifice 94B, a flowrate of the fuel through each second outlet orifice 94B as well as various other parameters of the second fuel circuit 90B may be tailored for operation of the gas turbine engine 20 at intermediate power settings. The second fuel circuit 90B, for example, may be sized and shaped at each second outlet orifice 94B to facilitate relatively high fuel atomization at a moderate fuel flow rate and/or with a moderate airflow rate through the swirler 72.

The third fuel circuit 90C includes a third flowpath 92C, a third circuit inlet and one or more third outlet orifices 94C. The third flowpath 92C extend within the respective fuel injector 62 from the third circuit inlet to the third outlet orifices 94C. For example, an upstream section 96C of the third flowpath 92C of FIG. 3 extends radially (relative to the nozzle axis 84) inward from the third circuit inlet, within the injector stem 78, to a downstream section 98C of the third flowpath 92C. The downstream section 98C of the third flowpath 92C of FIG. 3 extends axially (along the nozzle axis 84) from the upstream section 96C of the third flowpath 92C, within the injector nozzle 80, to the third outlet orifices 94C. The upstream section 96C of the third flowpath 92C may be at least partially (or completely) formed by an (e.g., annular) upstream third conduit 100C. The downstream section 98C of the third flowpath 92C may be at least partially (or completely) formed by a (e.g., annular) downstream third conduit 102C, where the third conduits 100C and 102C may be integral segments of a common, unitary conduit or may be separate fluidly coupled conduits. The upstream section 96C of the third flowpath 92C and its upstream third conduit 100C may extend circumferentially about (e.g., completely around) the upstream section 96A of the first flowpath 92A and its upstream first conduit 100A and/or the upstream section 96B of the second flowpath 92B and its upstream second conduit 100B. The downstream section 98C of the third flowpath 92C and its downstream third conduit 102C may extend circumferentially about (e.g., completely around) the downstream section 98A of the first flowpath 92A and its downstream first conduit 102A and/or the downstream section 98B of the second flowpath 92B and its downstream second conduit 102B. With such a configuration, at least a portion of the third flowpath 92C within the injector stem 78 and/or within the injector nozzle 80 may be annular.

The third outlet orifices 94C are disposed at (e.g., on, adjacent or proximate) the nozzle tip 86. Each of the third outlet orifices 94C of FIG. 3, for example, is recessed slightly radially inward (relative to the nozzle axis 84) from the outer surface 108 of the nozzle tip 86. Referring to FIG. 4, the third outlet orifices 94C are arranged circumferentially about the nozzle axis 84 and/or the first outlet orifice 94A in an annular third outlet orifice array. This third outlet orifice array and each of its third outlet orifices 94C are disposed radially outboard of the nozzle axis 84 and/or the first outlet orifice 94A by a radial distance 114 (relative to the nozzle axis 84).

The third fuel circuit 90C of FIG. 3 is configured to direct the fuel received from the fuel source 70 out of the injector nozzle 80 through each third outlet orifice 94C (e.g., into the swirler bore 88 and/or into the combustion chamber 58; see FIG. 2) along a respective third trajectory 106C. This third trajectory 106C is angularly offset from the nozzle axis 84 and/or the first trajectory 106A by a third trajectory angle 116 (see FIGS. 6A-C); e.g., an acute angle or a right angle. This third trajectory angle 116 may be between fifteen degrees (15°) and ninety degrees (90°); e.g., between fifteen degrees (15°) and thirty degrees (30°), between thirty degrees (30°) and forty-five degrees (45°), between forty-five degrees (45°) and sixty degrees (60°), etc. Changes to the third fuel circuit angle can be made to maximize fuel/air mixing at max power to control both NOx and smoke emissions while the first and second fuel circuits angles may be optimized for low power. In this way, fuel/air mixing is optimized over the entire power range. The third trajectory 106C may be selected to facilitate delivery of the fuel into a third (e.g., recirculation) zone within the combustion chamber 58 for combustion. The third trajectory 106C, a spray pattern of the fuel out of each third outlet orifice 94C, a flowrate of the fuel through each third outlet orifice 94C as well as various other parameters of the third fuel circuit 90C may be tailored for operation of the gas turbine engine 20 at high power settings to control both emissions and combustor tones. The third fuel circuit 90C, for example, may be sized and shaped at each third outlet orifice 94C to facilitate relatively high fuel atomization at a relatively high fuel flow rate and/or with a relatively high airflow rate through the swirler 72.

The fuel source 70 includes a fuel reservoir 118 and a fuel flow regulator 120. The fuel reservoir 118 is configured to contain the fuel before, during and/or after operation of the gas turbine engine 20. The fuel reservoir 118 may be configured as or otherwise include a tank, a bladder and/or a cylinder. The flow regulator 120 is configured to direct the fuel from the fuel reservoir 118 to the one or more fuel injector assemblies 68 and, more particularly, to the one or more fuel injectors 62. The flow regulator 120 may include one or more fuel pumps, one or more valves and/or one or more other devices for facilitating metered flow of the fuel from the fuel reservoir 118 to the fuel injectors 62 and selectively to the fuel circuits 90A, 90B and 90C.

Referring to FIGS. 2 and 3, the fuel system 66 is configured to deliver the fuel from the fuel source 70 through the fuel injectors 62 to the combustor 60 for combustion within the combustion chamber 58. At each (or at least one or some) of the fuel injectors 62, the first fuel circuit 90A provides (e.g., flows, delivers, directs, etc.) a first percentage of the fuel from the respective fuel injector 62 to the combustor 60. The second fuel circuit 90B provides a second percentage of the fuel from the respective fuel injector 62 to the combustor 60. The third fuel circuit 90C provides a third percentage of the fuel from the respective fuel injector 62 to the combustor 60. These first, second and third percentages may vary during operation of the gas turbine engine 20 in order to improve one or more select parameters (e.g., lean blow out, atomization, etc.) at low power while improving one or more select other parameters (e.g., reduction in NOx, reduction in nvPM (particulate matter standard), etc.) at high power. The fuel system 66 may thereby optimize combustion performance across various power settings by varying the percentages (relative proportions) of the fuel delivered by the fuel circuits 90. In addition to varying the percentages (relative proportions) of the fuel delivered by the fuel circuits 90, each of the fuel circuits 90 may be tailored for one or more select power settings; e.g., designed for increased fuel atomization, fuel placement, etc. For example, the first fuel circuit 90A may be tailored for low power settings. The second fuel circuit 90B may be tailored for intermediate power settings. The third fuel circuit 90C may be tailored for high power settings.

Figure 5:
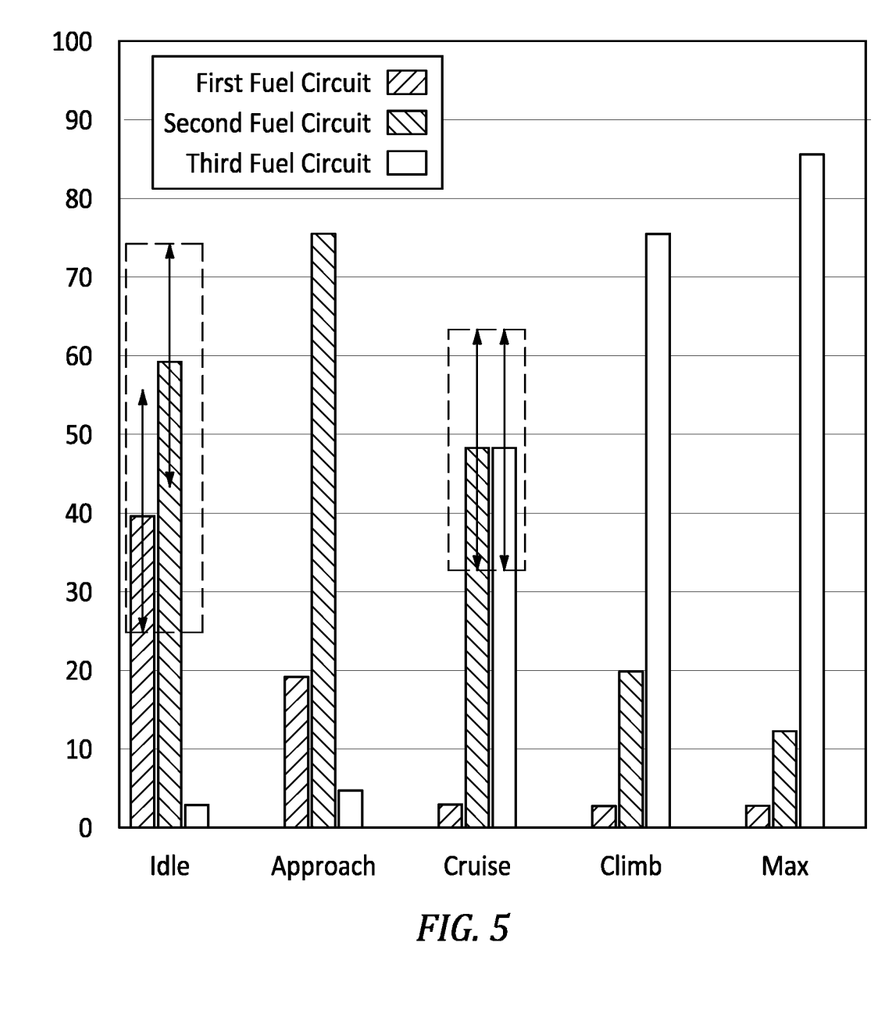
FIG. 5 is a graph depicting a fuel schedule for various fuel circuits in the fuel injector.

FIG. 5 graphically illustrates how the ratios between the first, the second and the thirds percentages may change at various engine power settings. For example, the first percentage and/or the second percentage may be greater than (e.g., 2 times, 5 times, 10 times) the third percentage at an engine idle setting; here, the third percentage may be close to or may be a zero percentage. The second percentage may also be greater than (e.g., 1.2 times, 1.5 times) the first percentage at the engine idle setting. The second percentage may be greater than (e.g., 2 times, 5 times, 10 times, 15 times) the first percentage and/or the second percentage at an engine approach setting. The first percentage may be greater than (e.g., 1.5 times, 2 times, 3 times) the third percentage at the engine approach setting; here, the third percentage may be close to or may be a zero percentage. The second percentage may be equal to, or within a percentage (e.g., +/−2%, 5%, 10%, 20%) of the third percentage at an engine cruise setting. The second percentage and/or the third percentage may be greater than (e.g., 5 times, 10 times, 15 times) the first percentage at the engine cruise setting; here, the first percentage may be close to or may be a zero percentage. The third percentage may be greater than (e.g., 2 times, 5 times, 10 times, 15 times) the first percentage and/or the second percentage at an engine climb setting. The second percentage may be greater than (e.g., 1.5 times, 2 times, 3 times) the first percentage at the engine climb setting; here, the first percentage may be close to or may be a zero percentage. The third percentage may be greater than (e.g., 5 times, 10 times, 15 times, 20 times) the first percentage and/or the second percentage at an engine max power setting. The second percentage may be greater than (e.g., 2 times, 3 times, 5 times) the first percentage at the engine max power setting; here, the first percentage may be close to or may be a zero percentage. The present disclosure, however, is not limited to the foregoing exemplary relationships between the first, the second and the third percentages.

Figure 6A:
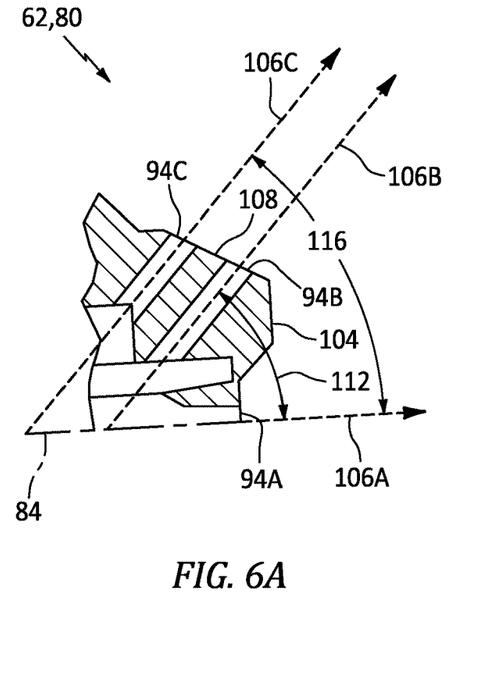
FIGS. 6A-C are partial side sectional illustrations of the fuel injector with various fuel circuit passage configurations.
Figure 6B:
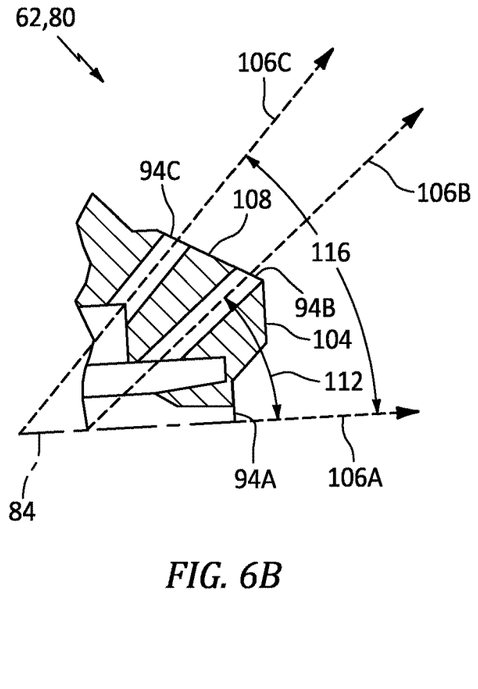
Figure 6C:
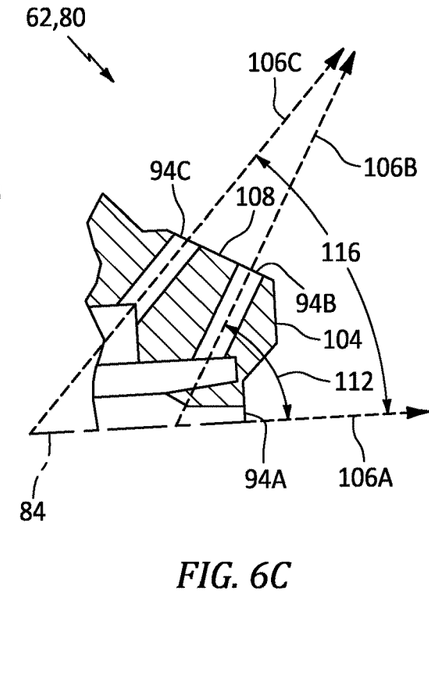

In some embodiments, referring to FIG. 6A, the injector nozzle 80 may be configured such that the second trajectory angle 112 associated with each (or at least one) second outlet orifice 94B is equal to the third trajectory angle 116 associated with each (or at least one) third outlet orifice 94C. In other embodiments, referring to FIGS. 6B and 6C, the injector nozzle 80 may be configured such that the second trajectory angle 112 associated with each (or at least one) second outlet orifice 94B is different than the third trajectory angle 116 associated with each (or at least one) third outlet orifice 94C. The second trajectory angle 112 of FIG. 6B, for example, is less than the third trajectory angle 116 to promote, for example, additional downstream travel of the fuel directed out from the respective second outlet orifice 94B. The second trajectory angle 112 of FIG. 6C, on the other hand, is greater than the third trajectory angle 116 to promote, for example, additional interaction with air traveling along the injector nozzle 80 through the swirler 72 (see FIG. 2).

Figure 7A:
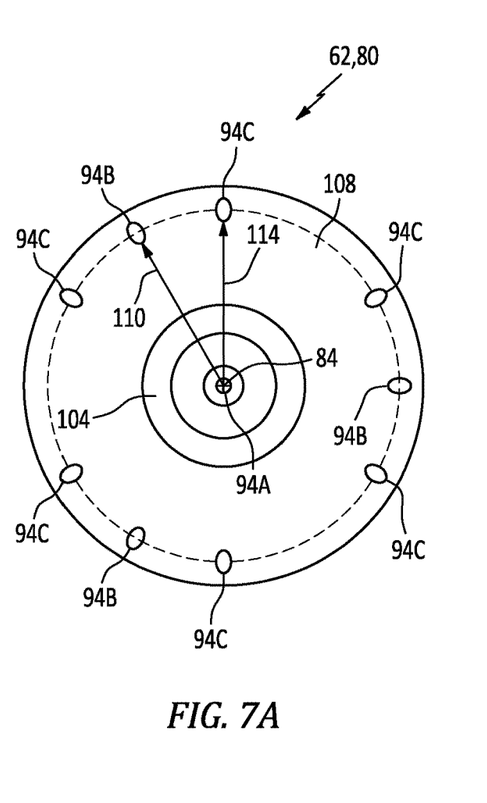
FIGS. 7A-C are end view illustrations of the nozzle tip with various outlet orifice arrangements.
Figure 7B:
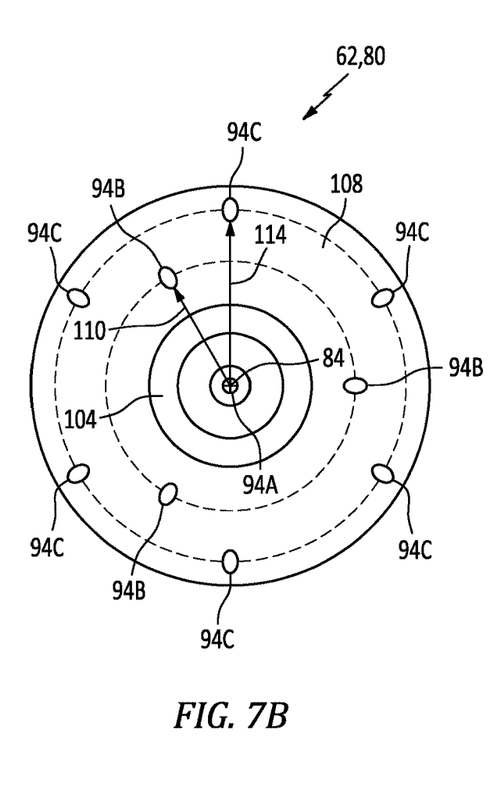
Figure 7C:
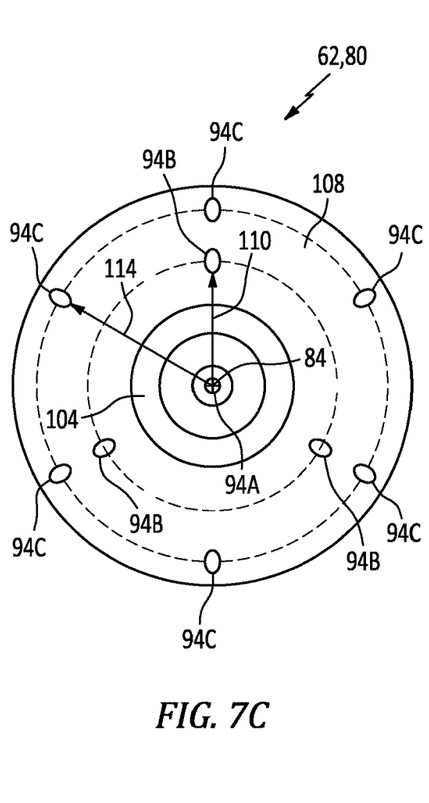

In some embodiments, referring to FIGS. 7A and 7B, each (or at least one) second outlet orifice 94B may be circumferentially offset from (e.g., and circumferentially spaced from) each of the third outlet orifices 94C. Each second outlet orifice 94B of FIGS. 7A and 7B, for example, is circumferentially centered between a respective circumferentially neighboring (e.g., adjacent) pair of the third outlet orifices 94C. Each (or at least one) second outlet orifice 94B, however, may alternatively be disposed circumferentially closer to one of the circumferentially neighboring pair of the third outlet orifices 94C than the other; e.g., asymmetrically aligned between the circumferentially neighboring pair of the third outlet orifices 94C. In other embodiments, referring to FIG. 7C, each (or at least one) second outlet orifice 94B may be circumferentially aligned with and/or circumferentially overlap a respective one of the third outlet orifices 94C.

In some embodiments, referring to FIG. 7A, the second outlet orifice array may be radially aligned with the third outlet orifice array. The radial distance 110 to each (or at least one) second outlet orifice 94B, for example, may be equal to the radial distance 114 to each (or at least one) third outlet orifice 94C. In other embodiments, referring to FIGS. 7B and 7C, the third outlet orifice array may be radially offset from the second outlet orifice array. The radial distance 110 to each (or at least one) second outlet orifice 94B, for example, may be less than the radial distance 114 to each (or at least one) third outlet orifice 94C. With this arrangement of FIGS. 7B and 7C, the third outlet orifice array is disposed radially outboard of the second outlet orifice array.

Figure 8A:
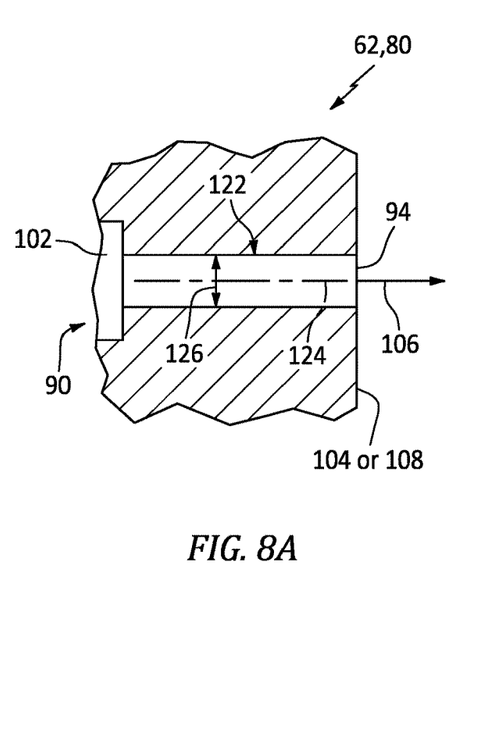
FIGS. 8A-C are partial side sectional illustrations of the fuel injector with various other fuel circuit passage configurations.
Figure 8B:
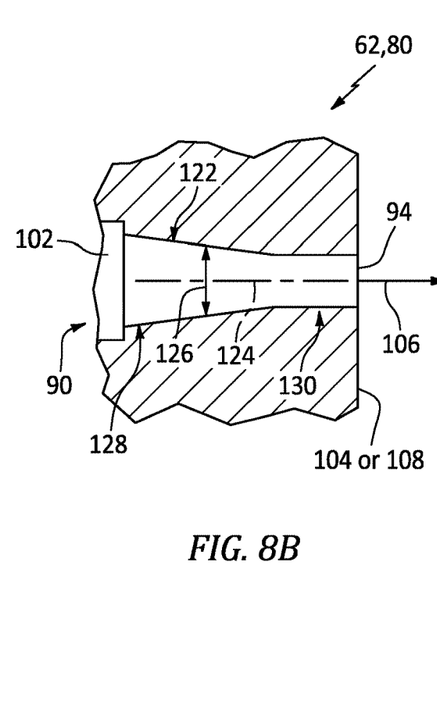
Figure 8C:
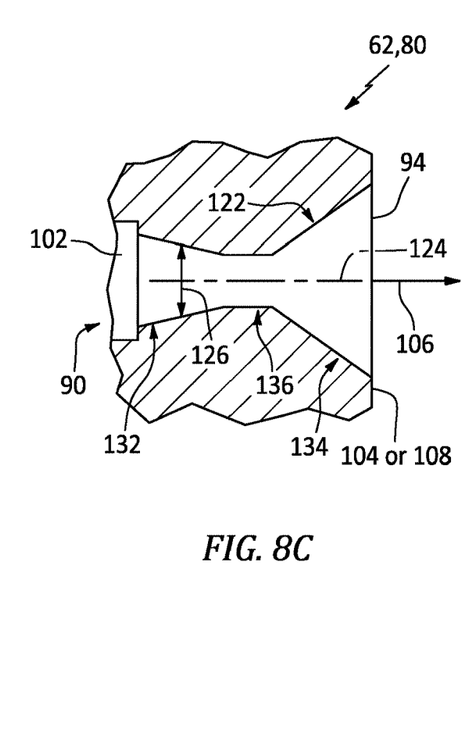

Referring to FIGS. 8A-C, each fuel circuit 90 includes a fuel circuit passage 122 associated with each outlet orifice 94A, 94B, 94C (generally referred to as "94"). This fuel circuit passage 122 extends longitudinally along a longitudinal centerline 124 of that fuel circuit passage 122, for example, from the downstream conduit 102A, 102B, 102C (generally referred to as "102") to the respective outlet orifice 94. The outlet orifice 94 may thereby be formed at and/or by a downstream end of the respective fuel circuit passage 122. At least a portion of the fuel circuit passage 122/the passage centerline 124 at the passage downstream end may be straight. The fuel circuit passage 122 has a lateral size 126 (e.g., a diameter) measured across the fuel circuit passage 122 (e.g., perpendicular to the passage centerline 124) between (e.g., diametrically) opposing sides of the fuel circuit passage 122. In some embodiments, referring to FIG. 8A, the passage size 126 may be uniform (e.g., constant) as at least a portion or an entirety of the fuel circuit passage 122 extends longitudinally along the passage centerline 124 towards (e.g., to) the respective outlet orifice 94. In other embodiments, referring to FIGS. 8B and 8C, the passage size 126 may change (e.g., decrease, increase, vary down and up, etc.) as at least a portion or an entirety of the fuel circuit passage 122 extends longitudinally along the passage centerline 124 towards (e.g., to) the respective outlet orifice 94.

Referring to FIG. 8B, the passage size 126 may decrease along an upstream portion 128 of the fuel circuit passage 122, while the passage size 126 may remain uniform along a downstream portion 130 of the fuel circuit passage 122 which extends longitudinally between the upstream portion 128 and the respective outlet orifice 94. The fuel circuit passage 122 may thereby be configured as a convergent passage. More particularly, the fuel circuit passage 122 of FIG. 8B converges inward towards the passage centerline 124 as that fuel circuit passage 122 extends longitudinally towards the respective outlet orifice 94.

Referring to FIG. 8C, the fuel circuit passage 122 may include an upstream portion 132, a downstream portion 134 and an intermediate portion 136 extending longitudinally from the upstream portion 132 to the downstream portion 134, where the downstream portion 134 extends longitudinally towards (e.g., to) the respective outlet orifice 94. The passage size 126 may decrease as the upstream portion 132 extends longitudinally towards (e.g., to) the intermediate portion 136. The passage size 126 may remain uniform along the intermediate portion 136 between the upstream portion 132 and the downstream portion 134. The passage size 126 may increase as the downstream portion 134 extends longitudinally from the intermediate portion 136 towards (e.g., to) the respective outlet orifice 94. The fuel circuit passage 122 may thereby be configured as a convergent-divergent passage.

In some embodiments, each of the fuel circuits 90 may be provided with common fuel circuit passage configurations; e.g., the configuration of FIG. 8A, 8B or 8C. In other embodiments, any two of the fuel circuits 90 may be provided with common fuel circuit passage configurations while the other fuel circuit 90 is provided with another fuel circuit configuration. In still other embodiments, each fuel circuit 90 may be provided with a discrete fuel circuit passage configuration.

Figure 9:
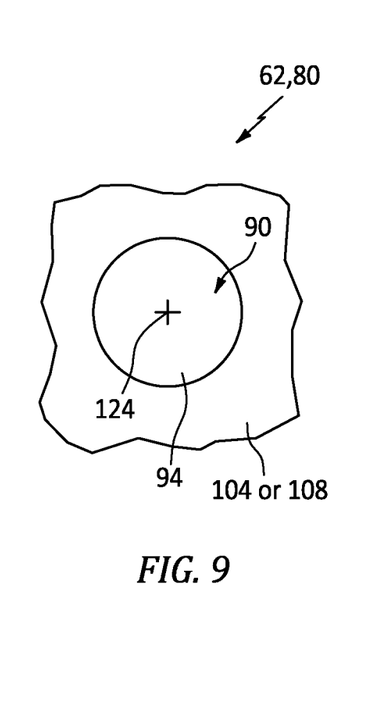
FIG. 9 is an illustration of a portion of the nozzle tip with an outlet orifice having a circular cross-sectional geometry.

In some embodiments, referring to FIG. 9, each (or at least one) outlet orifice 94 of any one, some or all of the fuel circuits 90 may have a circular cross-sectional geometry. In other embodiments, referring to FIG. 10A, each (or at least one) outlet orifice 94 of any one, some or all of the fuel circuits 90 may have a (e.g., radially, lengthwise) elongated cross-sectional geometry. The outlet orifice 94 of FIG. 10A, for example, has an oval cross-sectional geometry where, for example, the respective fuel circuit passage 122 of FIG. 10B has a circular cross-sectional geometry and that fuel circuit passage 122 extends to a surface (e.g., 104, 108) of the injector nozzle 80 at an angle; e.g., an acute angle. In still other embodiments, referring to FIG. 11A, each (or at least one) outlet orifice 94 of any one, some or all of the fuel circuits 90 may have a (e.g., tangentially, widthwise) elongated cross-sectional geometry. The respective fuel circuit passage 122 of FIGS. 11A and 11B, for example, is configured to provide a flat fan nozzle outlet; e.g., flat fan tip, a cat's eye tip, etc.

Figures 10A, 10B:
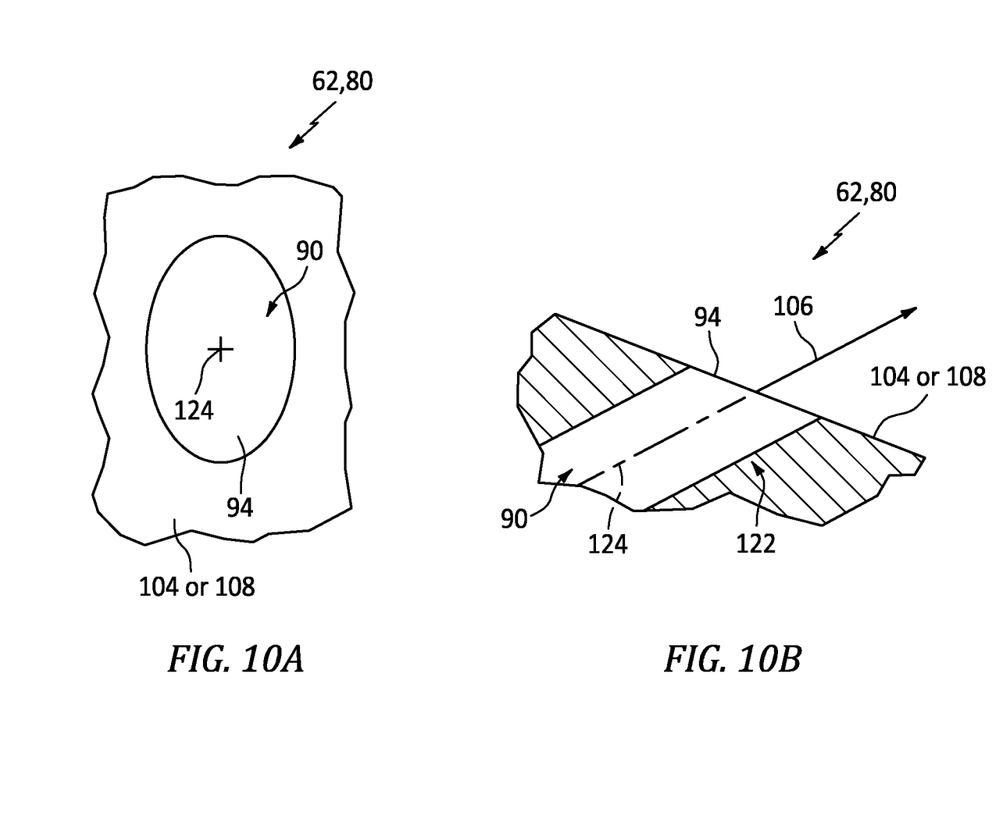
FIGS. 10A and 10B are illustrations of a portion of the nozzle tip with an outlet orifice having an elongated cross-sectional geometry.
Figure 11A:
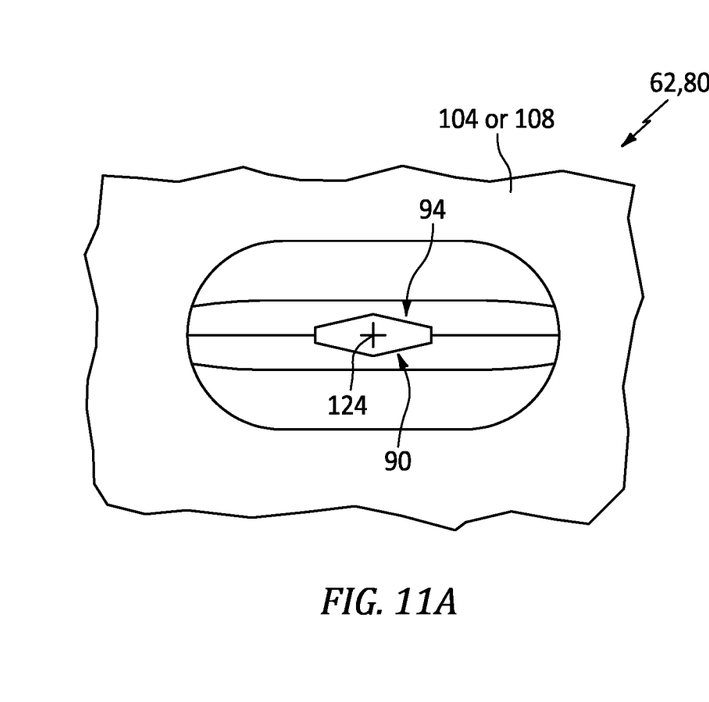
FIGS. 11A and 11B are illustrations of a portion of the nozzle tip with an outlet orifice having another elongated cross-sectional geometry.
Figure 11B:
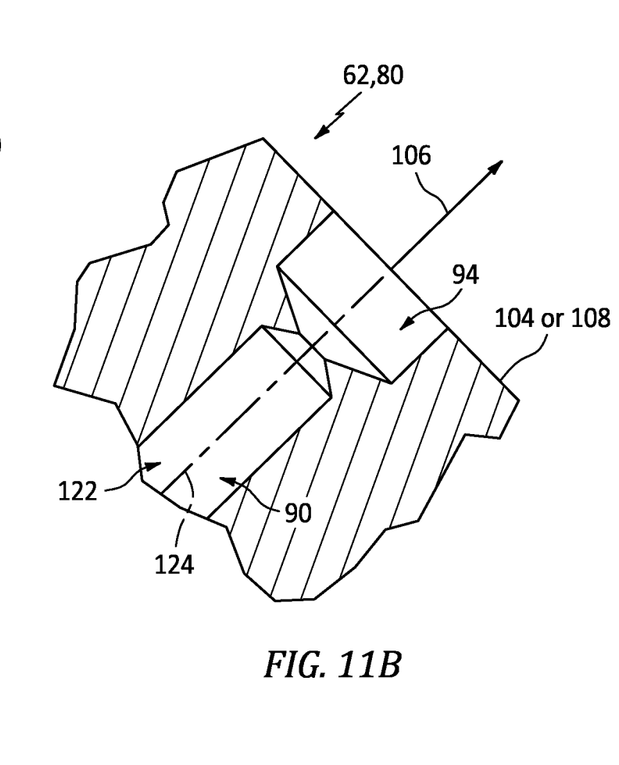

In some embodiments, each of the fuel circuits 90 may be provided with common outlet orifice configurations; e.g., the configuration of FIG. 9, 10A or 11A. In other embodiments, any two of the fuel circuits 90 may be provided with common outlet orifice configurations while the other fuel circuit is provided with another outlet orifice configuration. In still other embodiments, each fuel circuit 90 may be provided with a discrete outlet orifice configuration.

Figure 12A:
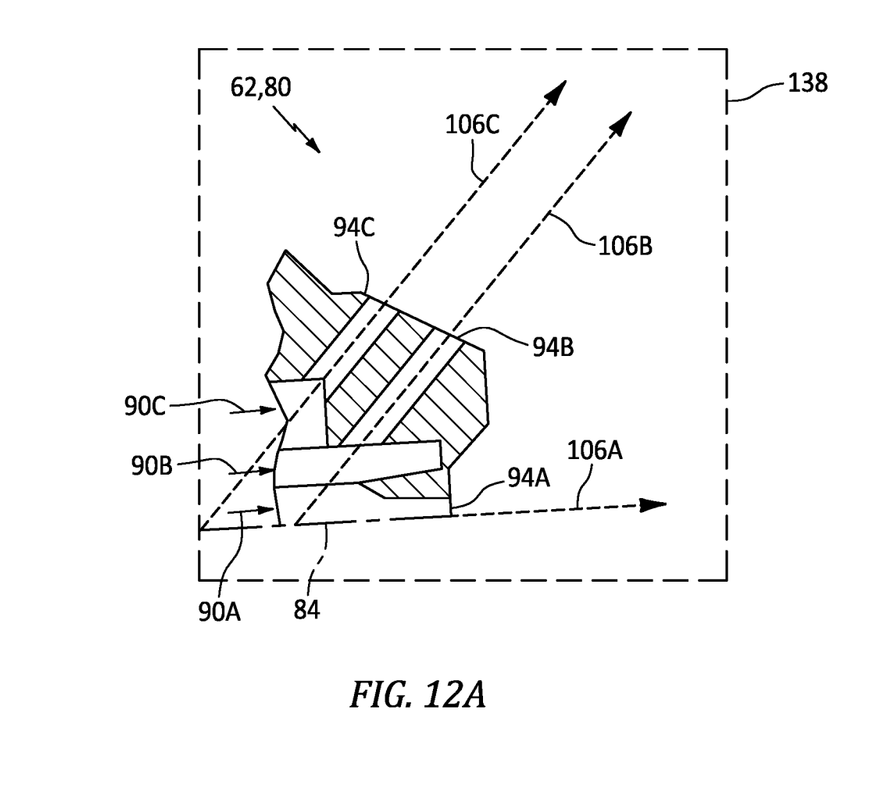
FIGS. 12A and 12B are illustrations of portions of the fuel injector with various other fuel circuit passage configurations.

In some embodiment, referring to FIG. 12A, each (or at least one) fuel circuit trajectory 106A, 106B, 106C may lay in a reference plane (e.g., 138) that includes the nozzle axis 84. In other embodiments, referring to FIG. 12B, each (or at least one) fuel circuit trajectory 106 (e.g., 106B, 106C) may be skewed (e.g., angularly offset) from and/or laterally offset from the reference plane 138 that includes the nozzle axis 84. With such an arrangement, the fuel circuit 90 may facilitate fuel swirl out of the injector nozzle 80.

Figure 12B:
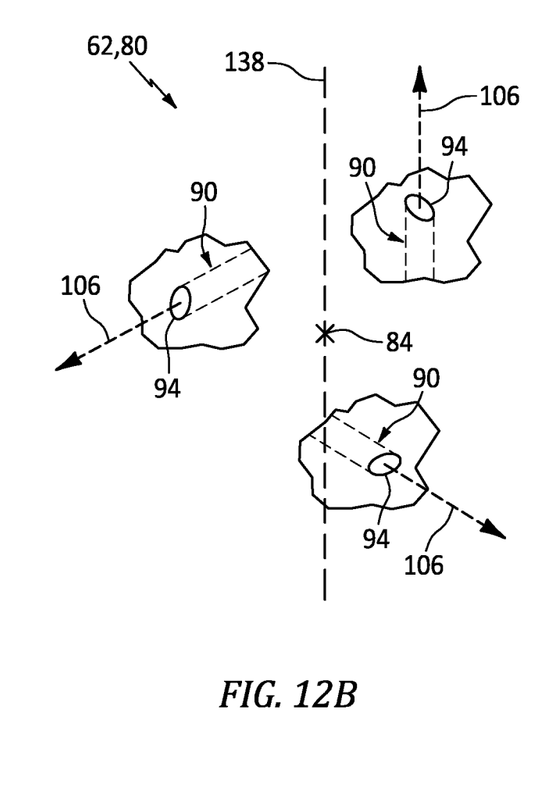

In some embodiments, each of the fuel circuits 90 may be configured for common trajectory orientations; e.g., the orientation of FIG. 12A or 12B. In other embodiments, the fuel circuits 90 (e.g., 90B and 90C) may be configured for discrete trajectory orientations. For example, the second fuel circuit 90B may be configured for the trajectory orientation of FIG. 12B and the third fuel circuit 90C may be configured for the trajectory orientation of FIG. 12A. In another example, both the second fuel circuit 90B and the third fuel circuit 90C may be configured for the trajectory orientations of FIG. 12B; however, a degree of trajectory skew from the reference plane may be different and/or in an opposing direction.

The fuel system 66 and its fuel injector(s) 62 may be included in various gas turbine engines other than the one described above. The fuel system 66 and its fuel injector(s) 62, for example, may be included in a geared gas turbine engine where a geartrain connects one or more shafts to one or more rotors in a fan section, a compressor section and/or any other engine section. Alternatively, the fuel system 66 and its fuel injector(s) 62 may be included in a gas turbine engine configured without a geartrain; e.g., a direct drive gas turbine engine. The fuel system 66 and its fuel injector(s) 62 may be included in a geared or non-geared gas turbine engine configured with a single spool, with two spools (e.g., see FIG. 1), or with more than two spools. The gas turbine engine may be configured as a turbofan engine, a turbojet engine, a turboprop engine, a turboshaft engine, a propfan engine, a pusher fan engine or any other type of gas turbine engine for an aircraft propulsion system. The gas turbine engine may alternatively be configured as an auxiliary power unit (APU) or an industrial gas turbine engine. The present disclosure therefore is not limited to any particular types or configurations of gas turbine engines.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for a gas turbine engine, comprising:
   a fuel system including a fuel source and a fuel injector;
   the fuel injector including a nozzle and a plurality of discrete fuel circuits including a first fuel circuit, a second fuel circuit and a third fuel circuit;
   the nozzle extending axially along an axis to a nozzle tip;
   the first fuel circuit comprising a first fuel outlet disposed at the nozzle tip, the first fuel circuit configured to direct fuel out of the nozzle through the first fuel outlet along a first trajectory;
   the second fuel circuit comprising a plurality of second fuel outlets arranged circumferentially about the axis at the nozzle tip in a second fuel outlet array, the second fuel circuit further comprising a passage that extends to a first of the plurality of second fuel outlets, and the passage converges as the passage extends towards the first of the plurality of second fuel outlets, and the second fuel circuit configured to direct the fuel out of the nozzle through the first of the plurality of second fuel outlets along a second trajectory that is angularly offset from the first trajectory;

the third fuel circuit comprising a plurality of third fuel outlets arranged circumferentially about the axis at the nozzle tip in a third fuel outlet array, the third fuel circuit is configured to direct the fuel out of the nozzle through a first of the plurality of third fuel outlets along a third trajectory that is angularly offset from the first trajectory; and the fuel system configured to deliver the fuel, during a first mode and a second mode, from the fuel source through the fuel injector where the first fuel circuit provides a first percentage of the fuel, the second fuel circuit provides a second percentage of the fuel and the third fuel circuit provides a third percentage of the fuel;

wherein, during the first mode, the first percentage and the second percentage are greater than the third percentage; and wherein, during the second mode, the third percentage is greater than the first percentage and the second percentage.

2. The assembly of claim 1, wherein the fuel system is configured to deliver the fuel during a third mode, and during the third mode, the second percentage is within ten percent of the third percentage.

3. The assembly of claim 1, wherein, during at least one of the first mode or the second mode, the second percentage is greater than the first percentage.

4. The assembly of claim 1, wherein
the second trajectory is angularly offset from the first trajectory by a first angle; and
the third trajectory is angularly offset from the first trajectory by a second angle that is equal to the first angle.

5. The assembly of claim 1, wherein the first trajectory is coaxial with the axis.

6. The assembly of claim 1, wherein the first fuel outlet is coaxial with the axis.

7. The assembly of claim 1, wherein the first of the plurality of third fuel outlets is circumferentially offset from each of the plurality of second fuel outlets.

8. The assembly of claim 1, wherein the second fuel outlet array is radially aligned with the third fuel outlet array.

9. The assembly of claim 1, wherein the first of the plurality of second fuel outlets has a circular cross-sectional geometry.

10. The assembly of claim 1, wherein the first of the plurality of second fuel outlets has an elongated cross-sectional geometry.

11. The assembly of claim 1, wherein
the fuel injector further includes a stem;
the nozzle projects axially out from the stem along the axis to the nozzle tip;
the first fuel circuit further comprises a first fuel conduit within the stem and fluidly coupled to the first fuel outlet;
the second fuel circuit further comprises a second fuel conduit within the stem and fluidly coupled to the plurality of second fuel outlets; and
the third fuel circuit further comprises a third fuel conduit within the stem and fluidly coupled to the plurality of third fuel outlets.

12. The assembly of claim 1, wherein
the fuel injector further includes a stem;
the nozzle projects axially out from the stem along the axis to the nozzle tip;
the first fuel circuit further comprises a first fuel conduit within the stem and fluidly coupled to the first fuel outlet;
the second fuel circuit further comprises a second fuel conduit within the stem and fluidly coupled to the plurality of second fuel outlets; and
the third fuel circuit further comprises a third fuel conduit within the stem and fluidly coupled to the plurality of third fuel outlets;
wherein a radially extending portion of the second fuel conduit circumscribes a radially extending portion of the first fuel conduit; and
wherein a radially extending portion of the third fuel conduit circumscribes the radially extending portion of the second fuel conduit.

* * * * *